(12) United States Patent
Ang

(10) Patent No.: US 6,662,289 B1
(45) Date of Patent: Dec. 9, 2003

(54) METHOD AND APPARATUS FOR DIRECT CONVEYANCE OF PHYSICAL ADDRESSES FROM USER LEVEL CODE TO PERIPHERAL DEVICES IN VIRTUAL MEMORY SYSTEMS

(75) Inventor: Boon Seong Ang, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 201 days.

(21) Appl. No.: 09/858,850

(22) Filed: May 15, 2001

(51) Int. Cl.[7] ............................................... G06F 12/00
(52) U.S. Cl. ..................... 711/202; 711/206; 711/207
(58) Field of Search ......................... 711/203, 206–207, 711/202

(56) References Cited

U.S. PATENT DOCUMENTS

| | | | |
|---|---|---|---|
| 3,533,075 A | | 10/1970 | Johnson et al. .......... 340/172.5 |
| 3,854,126 A | | 12/1974 | Gray et al. .............. 340/172.5 |
| 4,277,826 A | * | 7/1981 | Collins et al. ............. 364/200 |
| 4,279,014 A | | 7/1981 | Cassonnet et al. .......... 364/200 |
| 5,659,798 A | * | 8/1997 | Blumrich et al. ........... 395/846 |
| 5,701,486 A | * | 12/1997 | Gilbertsen et al. .......... 395/704 |
| 5,765,022 A | * | 6/1998 | Kaiser ........................ 395/842 |
| 5,987,582 A | * | 11/1999 | Devic ......................... 711/206 |
| 6,347,364 B1 | * | 2/2002 | Liedtke ....................... 711/163 |

OTHER PUBLICATIONS

IBM Technical Disclosure Bulletin, "Page Pinning By Software for I/O Requests", Aug. 1982, vol. 25, Issue 3B, pp. 1583–1585.*
IBM Technical Disclosure Bulletin, "Efficient Method of Providing Memory Buffer Physical Addresses", Nov., 1994, vol. 34, Issue 11, pp. 261–262.*

* cited by examiner

Primary Examiner—Kimberly McLean-Mayo

(57) ABSTRACT

A memory system and a set of user-level instructions that are callable from user-level code for converting virtual addresses to physical addresses and conveying the physical addresses to peripheral devices without requiring a system call. The system uses a translation look-aside buffer (TLB) implemented in a microprocessor. The contents of the TLB can be updated while processes are executing, allowing for virtual/physical addresses to be constantly updated and loaded into the buffer without requiring that the buffer be too large. Pages in use per transaction or user-level job are "pinned down" and pinned page counts per transaction or user-level job, as well as overall counts are maintained.

19 Claims, 4 Drawing Sheets

METHOD AND APPARATUS FOR DIRECT CONVEYANCE OF PHYSICAL ADDRESSES FROM USER LEVEL CODE TO PERIPHERAL DEVICES IN VIRTUAL MEMORY SYSTEMS

FIELD OF THE INVENTION

The present invention relates generally to the field of virtual memory systems. More specifically, the invention relates to virtual to physical address conversion for memory access from peripheral devices.

BACKGROUND OF THE INVENTION

Computer systems that utilize virtual memory systems are able to simulate more main memory than actually exists as long as there is sufficient disk storage space. When a program runs on such computer systems, the program is broken into segments or pages and the virtual memory system brings these pages from disk storage into the main memory as they are used by the program. As portions of the program are completed, pages are swapped. The system keeps track of which pages are in use and which have been modified.

Currently, in a virtual memory system, whenever a microprocessor executes user-level code, the microprocessor must perform a system call in order to pass commands specific to a peripheral hardware device to that device. These commands contain both functions or operations (e.g., read or write operations) and virtual addresses specific to those functions (e.g., address locations in memory where those read or write operations are to occur).

User-level code cannot simply pass the virtual address to the peripheral device in most situations because most peripheral hardware devices utilize physical addressing and have no way of converting the virtual address into a physical address. If the virtual address were passed, data would be written to or read from the wrong location or no operation would occur at all (in cases where a fault was returned). Accordingly, the code executing on a microprocessor will make a system call that converts the virtual addresses within the command into physical addresses, and then pass the command to the peripheral hardware device along with the actual physical addresses.

Additionally, in a virtual memory system which employs memory paging, the memory pages that the virtual addresses correspond with or point to (i.e., those pages which are being used by the peripheral hardware device) must be "pinned down" in order to ensure that they are not swapped out of the main memory while the peripheral device is accessing them. This is particularly important in a symmetric multiprocessing (SMP) environment, where multiple processors have access to and share the same common centralized main memory system. It is important that any page not be swapped out until all peripheral accesses have completed.

For example, a microprocessor may execute user-level code which requires an Ethernet/network card to retrieve some data from several different virtual address locations (which correspond with actual physical address locations in the memory) and pass that data out over the network to which the computer system is connected. When this is encountered in user-level code, the peripheral hardware device must receive physical addresses in order to perform the data send command. Accordingly, whenever this function is encountered in user-level code, the microprocessor will perform a system call in order to convert the virtual addresses in the instruction set into physical addresses. These physical addresses are then passed to the peripheral device so that the peripheral device knows where (which physical addresses) to access the data from in the memory. Therefore, in this example, the virtual address locations from which the data is to be retrieved must be converted into actual physical address locations in the memory so the physical addresses can be transferred to the peripheral hardware device (in this case, the Ethernet card). Moreover, the memory pages that correspond with the virtual address locations must be "pinned down" in order to ensure that they are not swapped out while the ethernet card is accessing them.

Performing system calls incurs high overhead and can significantly delay processing. As networking becomes more pervasive and network access to virtual memory occurs more frequently, the cost and overhead of performing system calls during each network access to the virtual memory becomes increasingly taxing on overall system performance.

One solution to this problem which has been implemented in the prior art is to assign blocks of memory locations to user code and to configure a memory controller with the ability to convert the virtual address locations into actual physical address locations. In this proposal, a block of physical addresses is assigned to a process which is executing at the user code level, and this block of physical addresses is mapped into the virtual addresses used by that process. These addresses are then stored in a table which is accessed by the memory controller in order to convert virtual addresses to physical addresses. Any peripheral device access requested by this process must come from this specially configured memory block, which is only a small subset of the process's total virtual address space. This solution requires that continuous blocks be assigned per application or process in order to ensure reliability and accuracy. The table cannot be updated as processes are running except at significant overhead cost, so in general, all possible virtual address locations that may be accessed must be loaded into the table. However, since any one application may access data from many different virtual address locations, it is hard to gauge the size of each block which must be assigned. Moreover, this approach will not work in existing TCP/IP applications where addresses to be accessed by a peripheral device like an Ethernet card are assigned from the full virtual address space rather than a specially configured subset of the virtual address space.

Accordingly, what is needed is a way to convert virtual addresses to physical addresses at the user code level without requiring system calls to convert the addresses to physical addresses. What is further needed is a means for conveying the translated physical address to the peripheral device while guaranteeing that the physical address is indeed one to which that user-level job or function is permitted access. What is further needed to convey the translated physical address to the peripheral device is to place that information onto the data portion of a bus transaction addressed to the peripheral device. What is further needed is a way to ensure that the page where the physical address is located can be "pinned down" once it has been accessed by a peripheral device, so that it is not swapped out until the device is finished using the pages.

SUMMARY OF THE INVENTION

The invention includes a memory system and a set of user-level instructions, i.e. instructions that are callable from user-level code, for converting virtual addresses to physical addresses without requiring a system call. In a preferred embodiment of the invention, the memory system includes a memory, a memory controller, a microprocessor, and one or more peripheral devices. In a preferred embodiment, the system of the present invention uses an extended version of a conventional translation look-aside buffer (TLB) implemented in the microprocessor to allow user-level code running on the microprocessor to convert virtual addresses to physical addresses, pin the associated page, and convey the physical address to a peripheral device, without making any system calls. The result of the translation is conveyed to a peripheral device via a bus transaction wherein the address portion of the bus transaction targets the peripheral device, while the data portion of the bus transaction holds the result of the translation (i.e. the physical address where the memory access is to occur). The system further allows user-level code to unpin a previously pinned page once the peripheral access has completed. The system further ensures that user-level handling of physical addresses and the conveyance of physical addresses to peripheral devices precludes forgery of physical addresses by user-level code.

In a preferred embodiment, the system of the present invention allows for multiple requests to access and pin a page in the memory from multiple peripherals. The system of the present invention, includes counters for tracking the number of pins to each page. Using these counters, the present invention ensures that a page is precluded from being paged out until only after a number of unpins matching the number of prior pins counted for that page has occurred.

In a preferred embodiment, the present invention also tracks the total number of pages which are in use by peripheral devices, i.e., being written to or read from in the memory by a peripheral connected to the computer system in which the present invention is implemented. Pages which are in use per transaction or user-level job are "pinned down" and a total count of the number of pinned memory pages per transaction or user-level job is maintained in order to ensure that a single transaction or user-level job does not use too much memory space, thereby halting other processes from operating concurrently. In a preferred embodiment, total pages pinned counts per transaction or user-level job, as well as overall pinned pages counts system wide in the entire memory are maintained. These counts are compared to allowable transaction or user-level job maximum and overall system maximum values. In this way, no one transaction or user-level job has access to more than a predetermined maximum number of memory locations and the overall size of the memory allocated to concurrently executing transactions may also be limited.

DETAILED DESCRIPTION OF THE PREFERRED EMBODIMENTS

In the present invention, translations of virtual to physical addresses take place at the user code level and physical addresses are passed directly to a peripheral hardware device in the data portion of a bus transaction from the user-level code without requiring a system call. The invention includes a memory system and a set of user-level instructions that are callable directly from user-level code for translating virtual addresses and conveying that information to a peripheral hardware device. This set of user-level instructions also performs pinning and unpinning of pages, where pinned pages will not be paged out by the virtual memory system.

System Overview

In a preferred embodiment, the present invention is implemented in a computer system which includes a memory, a memory controller, a microprocessor, and one or more peripheral devices. In a preferred embodiment, the microprocessor includes an extended version of a conventional translation look-aside buffer (TLB). Like a conventional TLB, the TLB in this invention contains a subset of all mapping from the virtual addresses in the memory to their corresponding physical memory address locations. In a preferred embodiment, each entry in the TLB includes fields to track whether the page represented by the entry is pinned, and the number of times the page has been pinned. Utilizing the TLB, the microprocessor enables user-level code to convert virtual addresses to physical addresses, pin the associated page and convey the physical address to a peripheral device, without making any system calls. The physical address resulting from the translation is conveyed to a peripheral device via bus transactions wherein the address portion of each bus transaction specifies the peripheral device, while the data portion of each bus transaction holds the result of an address translation (i.e. the physical address where the memory access is to occur). As physical addresses are conveyed, the corresponding page in the memory is "pinned". This is reflected in the TLB, as well as the main page table in the main memory.

The system further allows user-level code to unpin a previously pinned page when peripheral access has completed. The system further ensures that user-level handling of physical addresses and conveying physical addresses to peripheral devices preclude forgery of physical addresses by user-level code. The system further ensures that a pinned page will not be paged out by the virtual memory system until it is completely unpinned. The system further accommodates multiple requests to pin a page. In a preferred embodiment, the system includes a series of counters which track the number of times pages in the memory are pinned. A particular page which has pinned multiple times will not be pages out until only after a number of unpins matching the number of preceding pins counted for that page has occurred.

Figure 1:
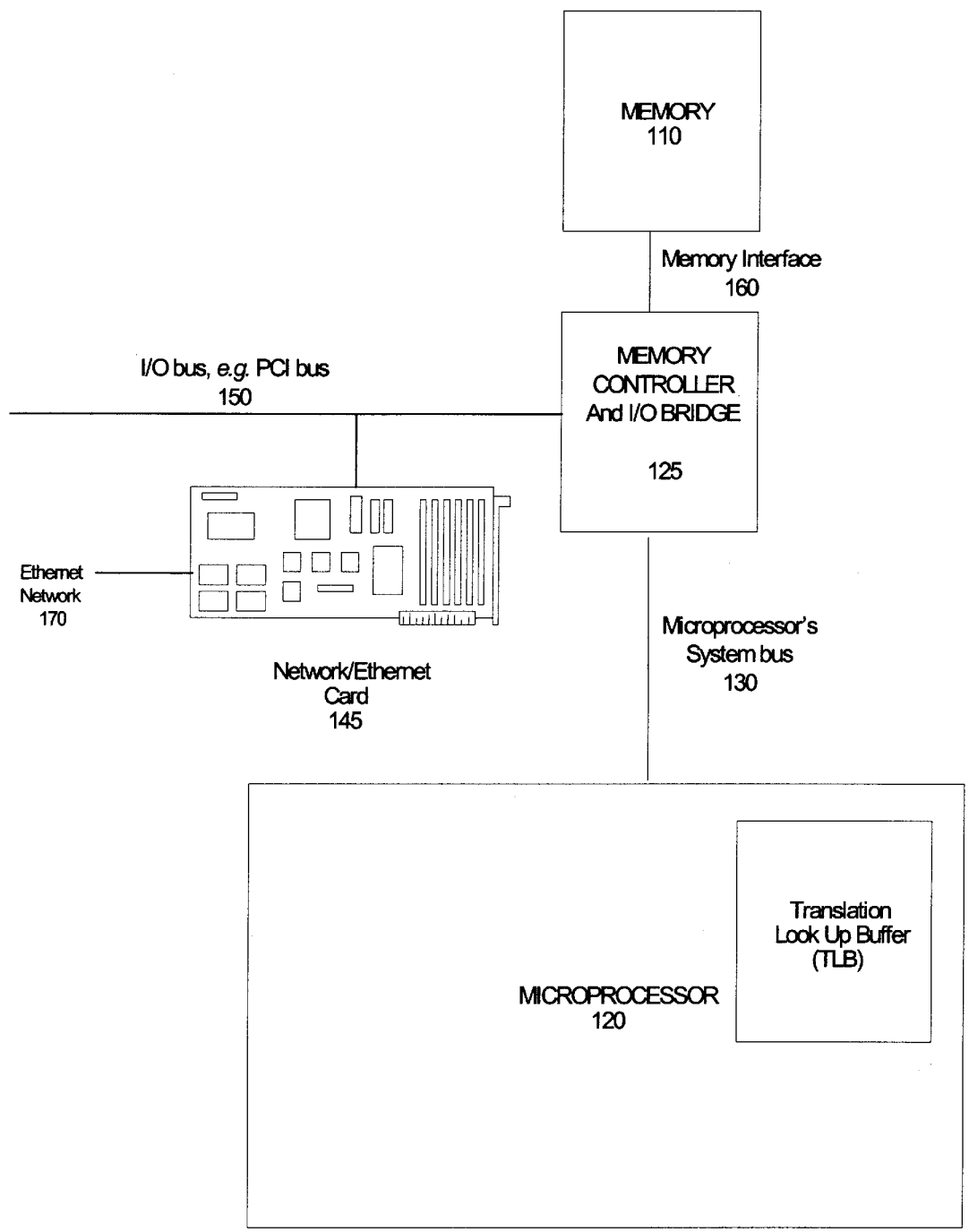
FIG. 1 illustrates a functional block diagram of a computer system in which a preferred embodiment of the present invention is implemented.

FIG. 1 illustrates a functional block diagram of a computer system 101 in which a preferred embodiment of the present invention is implemented. As shown, the computer system 101 includes a memory 110, a microprocessor 120, a memory controller and I/O bridge 125. The microprocessor 120 includes an extended translation look-aside buffer (TLB) a and the microprocessor 120 is coupled to the memory controller and I/O bridge 125 via the microprocessor's memory bus 130. The memory controller and I/O bridge 125 is further coupled to the memory 110 via a memory interface 160. The memory controller and I/O bridge 125 is further coupled to an I/O bus (e.g. PCI bus) 150. The computer system further includes at least one peripheral hardware device, such as a network/Ethernet card 145 that is coupled to the system via the I/O bus 150. The computer system may have additional peripheral hardware devices such as a sound card, a video graphics card, or a disk drive controller (e.g. SCSI controller) which are not illustrated. It is understood that the present invention can be used to translate virtual addresses into physical addresses and provide those physical addresses to any type of peripheral hardware device, and is not intended to be limited for use solely with a network/Ethernet card.

In operation, the microprocessor 120 executes a program for a user-level job comprised of user-level code containing various commands and operations. The user-level code utilizes virtual addressing in order to convey address information within the code. When the user-level code require one of the peripheral hardware devices to perform some memory operation, it issues instructions to the microprocessor to perform a virtual to physical address conversion and convey the address information to the peripheral hardware device in accordance with a preferred embodiment of the present invention. This is all done in the user-level code and does not require a system call in order to do the virtual to physical address conversion. Utilizing the set of user-level instructions introduced in this invention, the microprocessor 120 accesses the TLB to convert the virtual memory address into its corresponding physical memory address. The microprocessor will also pin the associated memory page and this will be reflected in the TLB and also back in the main page table in the main memory.

As an example, if the user-level code wants to command the network/Ethernet card 145 to retrieve data from certain locations in the memory 110 and pass that data out of a network to which the computer system is coupled, it issues instructions to the microprocessor 120 to determine the physical address of the network/Ethernet card 145 and the physical address locations where the data is to be retrieved from the memory 110, all in accordance with a preferred embodiment of the present invention and without requiring any system calls. The commands, including the physical addresses from which the data is to be retrieved, are then passed to the network/Ethernet card 145 in accordance with a preferred embodiment of the present invention.

As explained, the system uses a TLB implemented in the microprocessor, which allows the microprocessor to convert virtual addresses to physical addresses from the user-level code, without making any system calls. The TLB is preferably a cache capable of holding several tens to several hundreds of virtual to physical address mappings, each referred to as a TLB entry. In a preferred embodiment, the contents of the TLB can be updated as processes are executed, allowing for new information to be loaded into the TLB and existing information to be updated. Moreover, if the virtual address cannot be found in the TLB, the system is configured to search the page table entries (PTE) in the main page table in the main memory until the correct virtual address and its corresponding physical address are found, and loaded into the TLB. In a preferred embodiment, this search is done by microprocessor hardware.

Figure 2:
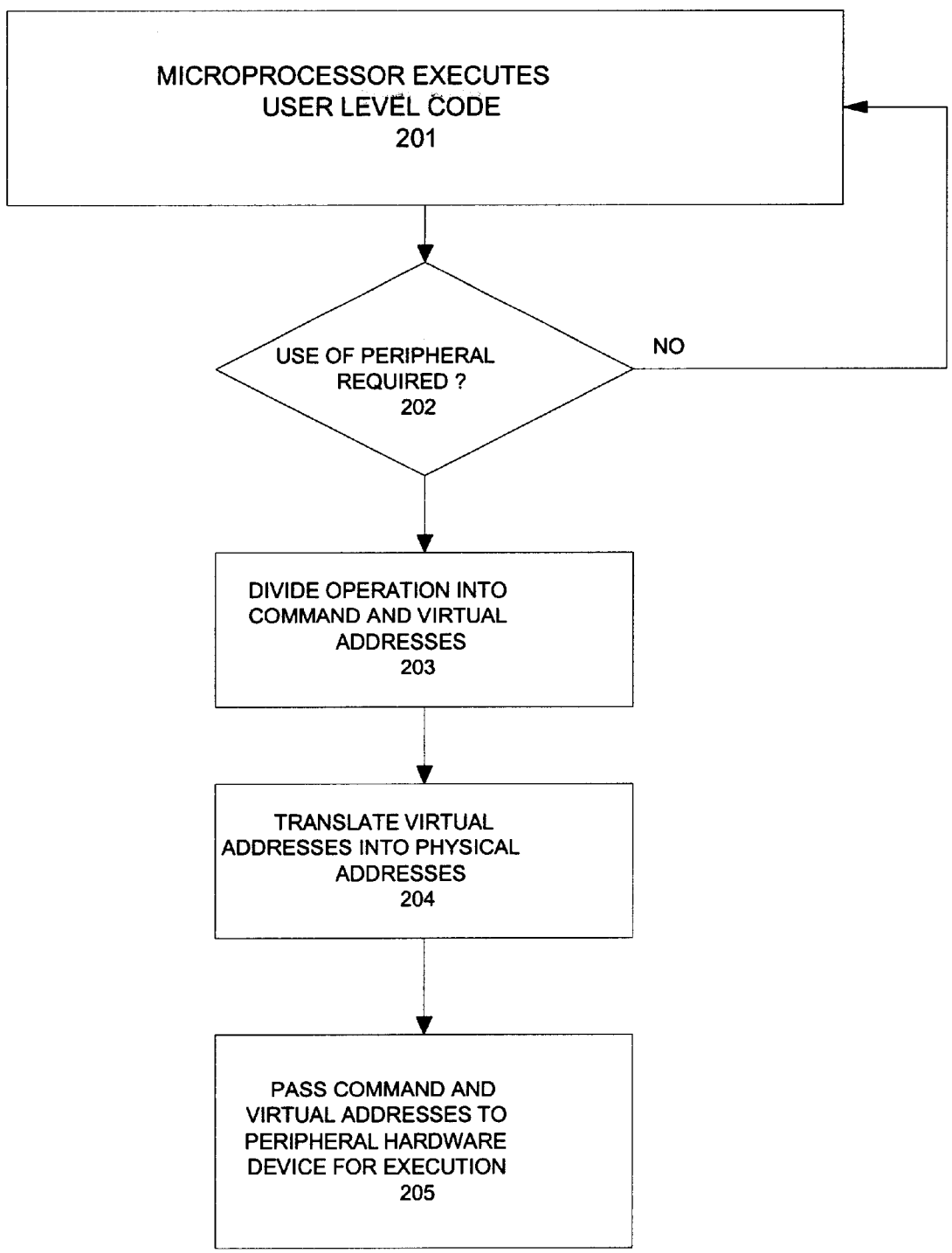
FIG. 2 illustrates a flow diagram which shows the steps for passing physical addresses to a peripheral device at the user code level, in accordance with a preferred embodiment of the present invention.

FIG. 2 illustrates a flow diagram which shows the steps for passing physical addresses to a peripheral device at the user code level, in accordance with a preferred embodiment of the present invention. As shown in FIG. 2, a microprocessor executes user-level code for a particular user-level job or process 201. When the code determines that it requires the use of a hardware peripheral device to perform some operation requiring access to the memory 202, it divides the command to the peripheral device into a command type specification and the virtual addresses in the memory associated with that command type 203. It uses instructions that when executed on the microprocessor will translate or convert the virtual addresses into physical addresses, and pin the associated page using the TLB that is resident in the microprocessor 204. The TLB is a translation look-aside buffer or cache that allows the microprocessor to quickly convert the virtual addresses into actual physical addresses without making any kind of system call. Once the virtual addresses have been converted into physical addresses, the user-level code issues instructions to the microprocessor that will pass the command type specification and the physical addresses to the peripheral hardware device, where the command is executed 205. In a preferred embodiment, the command type specification and the physical addresses are conveyed to the peripheral device using different mechanisms. The mechanism for conveying physical address ensures that user-level code only transfer legitimate physical address and not any arbitrary value forged by either erroneous or malicious user-level code. The command type specification, in contrast, is a value specified directly by user-level code and is therefore conveyed to the peripheral device with a different mechanism. Additional details about the mechanisms for conveyance of information to peripheral devices is provided below under the section titled "Determining Physical Address of Peripheral Device".

General Translation Instruction:

As explained, the invention includes a set of user-level instructions for converting virtual addresses into physical addresses and conveying the physical addresses to a peripheral device, all at the user code level.

In a preferred embodiment, the invention uses the following instruction at the user code level for translating virtual addresses to physical addresses, pinning the associated page, and conveying the result to a peripheral device:

Trans_and_pin <vaddr>, <target>, <outcome>

Where:

<target> is a source operand containing a virtual address of the peripheral hardware device to which the instructions are being issued;

<vaddr> is a source operand containing the memory virtual address that needs to be translated into physical address; and <outcome> is a destination operand, into which is stored indications of whether the translation from virtual address to physical address has been executed successfully and if not, the reasons for the failure.

This instruction first takes the virtual address <vaddr> and translates it into its corresponding physical address. During the translation process, access rights are checked to ensure that the virtual address is a valid one, and the user process issuing this instruction has permission to access the address. If the virtual address is valid, and the user process issuing the instruction has permission for access, then the translation from virtual to physical address is performed using the TLB in the microprocessor. If the translation succeeds, an attempt is made to pin the corresponding memory page. Details of the pinning process are described below in the section titled "Pinning Down pages in Use", including when pinning might fail. If the translation and pinning are both successful, the resulting physical address is conveyed to the peripheral device address specified by <target>. Because <target> is also a virtual address, this write occurs only after the virtual address in <target> is successfully translated into a corresponding physical address. This second translation is subject to checks ensuring that the virtual address in <target> maps to a valid physical address of a peripheral device and the user-level process issuing this instruction has the permission to write to it. The two translations of virtual to physical addresses, the associated permission checks, and pinning the associated page are done using the TLB in the microprocessor.

Writing to <target> is achieved by the microprocessor issuing a bus transaction on its system bus 130. The address portion of this bus transaction is the physical address resulting from translating the virtual address specified in <target>, while the data portion of this bus transaction is the physical address resulting from translating the virtual address specified in <vaddr>. The bus transaction is relayed by the memory controller and I/O bridge 125 on to the I/O bus 150 where it is seen by the peripheral device.

The Trans_and_pin instruction has a destination operand <outcome>. When the instruction has finished executing, <outcome> contains an indication of whether the instruction has completed successfully, and if not, the reason for failure. The instruction fails if any of the two virtual to physical address translation fails, or if pinning the page associated with <vaddr> fails.

In its simplest form, the Trans_and_pin instruction only translates for a single address. It is the software's responsibility to perform a translation for each page it is interested in, i.e., software has to know where page boundaries are. For most systems, this is very simple because pages are fixed size and properly aligned. In an alternate preferred embodiment, a variant of the Trans_and_pin instruction conveys to the user code the size of the address space that has been pinned during a successful execution of a Trans_and_pin instruction. This information is conveyed through the <outcome> destination operand. Hence, in this variant, the <outcome> includes information on whether the translation and conveyance of the physical address has succeeded, and the size of the memory page pinned. If the translation and conveyance fails, no pages are pinned and <outcome> will contain the reasons for failure.

Determining Physical Address of Peripheral Device

In the present invention <target> must be mapped to a physical address of a peripheral device which a normal user-level code cannot write to directly using normal store functions from user code, thereby ensuring that user code will not pass virtual addresses to the peripheral device; but, will instead pass physical addresses to the peripheral device using only the methods and set of user-level instructions of the present invention. In a preferred embodiment, one way of ensuring that <target> is mapped to a physical address of a peripheral device that can only be accessed from user code using the methods and instructions of the present invention is to extend the general virtual address space and provide for a unique category of addresses called peripheral physical address ports. The PTE and TLB entries keep track of whether a particular virtual address is a peripheral physical address port. User-level code that attempts to write to a peripheral physical address port can only do so with a Trans_and_pin instruction. An attempt to write to a peripheral physical address port using a normal store instruction will fail and trigger an exception fault on the microprocessor. System level code, because it is trusted code, is exempt from this restriction and permitted to write to a peripheral physical address ports using normal store instructions.

In a preferred embodiment, a peripheral device will have two address regions, one a peripheral physical address port region through which physical addresses are conveyed to the peripheral device, and a conventional memory mapped address region through which command type specifications are conveyed to the peripheral device using normal store instructions. When a peripheral device receives a command type that requires associated physical addresses, it will extract the relevant physical addresses from a corresponding peripheral physical address port. Hence a user-level function request to the peripheral device is specified in two halves, one half directed to a peripheral physical address port region using a Trans_and_pin instruction and another half using a normal store instruction. This approach both ensures that the user-level code can only convey valid physical addresses to the peripheral device while allowing arbitrary value to be specified as the command type specification.

Variant of Trans_and_Pin That Can be Implemented More Efficiently

In a preferred embodiment, the general translation function, Trans_and_pin actually requires two separate address conversions. The virtual address of <target> must be converted into a physical address and the virtual address <vaddr> in the general memory space where the read/write operations are to occur must also be converted to physical address spaces and sent to the peripheral device. This will require an execution of Trans_and_pin to access the TLB two times. In contrast, execution of an existing normal load or store instruction only requires one TLB access. While it is possible to design a microprocessor that accommodates the Trans_and_pin instruction with its two TLB access requirement, an alternate embodiment of this invention uses two separate instructions to achieve the same function of the Trans_and_pin general translation instruction:

Trans_and_pin_only <vaddr> <phy_addr_reg> <outcome>
Where:
<vaddr> is a source operand containing the memory virtual address that needs to be translated into physical address;
<phy_addr_reg> is a destination operand, specifying a register in a special physical address register file that can only be written to from user-level code using this Trans_and_pin_only instruction; and
<outcome> is a destination operand, into which is stored indications of whether the translation from virtual address to physical address has been executed successfully and if not, the reasons for the failure;

and

Send_physical <phy_addr_reg> <target>
Where:
<phy_addr_reg > is a source operand specifying a register in the special physical address register file; and
<target> is a source operand containing a virtual address of the peripheral hardware device to which the instructions are being issued.

The Trans_and_pin_only instruction takes the virtual address <vaddr>, translates it into a physical address using the TLB in the microprocessor. During the translation process, access rights are checked to ensure that the virtual address is a valid one, and the user process issuing this instruction has permission to access the address. If translation succeeds, an attempt is made to pin the corresponding memory page. Details of the pinning process are described below in the section titled "Pinning Down pages in Use", including when pinning might fail. If the translation and pinning are both successful, the resulting physical address is written to the physical address register specified by <phy_addr_reg>.

In a preferred embodiment, physical address registers are a special type of registers implemented in the microprocessor. In addition to containing a physical address, each physical address register has a valid bit that indicates whether it contains a valid physical address. Initially, a physical address register does not hold a valid physical address, and this fact is indicated in the valid bit. User-level code can only write a physical address register to contain a valid physical address using the Trans_and_pin_only instruction. System-level code, because it is trusted, is exempt from this restriction; thus a preferred embodiment can directly move values from a general purpose register into a physical address register, and in so doing, set the valid bit to indicate a valid physical address.

The Trans_and_pin_only instruction also indicates whether the translation has been completed successfully in <outcome>. The instruction fails if translation or page pinning fails. An alternate preferred embodiment also indicates in <outcome> the size of the page pinned in the event of successful execution of this instruction. This instruction is executable at the user-level and allows physical addresses to be stored in the register <phy_addr_reg>. It is used in conjunction with the Send_translation instruction described next.

The Send_physical instruction translates the virtual address of <target> into its corresponding physical address using the microprocessor's TLB and writes to this address the physical address stored in the special register <phy_add_reg >. The translation is subject to checks ensuring that the <target> is a valid virtual address and the user-level process issuing this instruction has the permission to write to it. If translation fails, an access violation exception is raised. When reading from the physical address register <phy_add_reg>, Send_physical instruction checks the valid bit of that register to ensure that it is set. If it is not set, an exception is raised and the execution of this instruction is suspended. Standard methods of dealing with run-time exception known in the art apply when an exception is raised.

Writing to the physical address resulting from translating the virtual address <target> is achieved by the microprocessor issuing a bus transaction on its system bus 130. The address portion of this bus transaction is the physical address resulting from translating the virtual address specified in <target>, while the data portion of this bus transaction is the physical address read from <phy_add_reg>. This bus transaction is relayed by the memory controller and I/O bridge 125 on to the I/O bus 150 where it is seen by the peripheral device.

In a preferred embodiment of this invention, the virtual address of <target> is constrained to correspond with one of the peripheral physical address port. The system of the present invention will check to ensure this, and if the virtual address in <target> does not correspond with an entry in the TLB or the page table that has the peripheral physical address port type bit set, thereby indicating it is a peripheral device physical address port, then the Send_physical command fails and an exception is raised.

Pinning Down Pages in Use

In a preferred embodiment of the present invention, pages in use per transaction or user-level job are "pinned down" to ensure that they are not paged out. Moreover, in a preferred embodiment of the present invention several different pin counts are maintained. First, pin counts on a per page basis (i.e. a repeated-pin-count) are maintained for the number of times a page has been pinned with either the Trans_and_pin or Trans_and_pin_only instruction. This count, maintained by a field in each TLB entry, is used to maintain correct behavior during unpinning as described in the section titled "Unpinning Pages After Use". Second, a per-process pinned page count is maintained in order to ensure that a single transaction or user-level job does not pin too much memory space, thereby halting other processes from operating concurrently. Accordingly, each time a page is pinned by the current process, the pinned pages per process count is incremented in order to show the total number of pages pinned by any one process at any time.

Accordingly, in a preferred embodiment of the present invention, the Trans_and_pin and Trans_and_pin_only instructions described herein will also operate to pin down the memory pages referenced once the instruction has been executed successfully. This is accomplished by setting a bit in the relevant entry in the TLB in the microprocessor when the instruction is executed. Accordingly, the entries in the TLB in the microprocessor will each contain an extra bit space, called the pinned-bit, to accommodate for this feature.

If a page has not been previously pinned, then the extra bit space in the relevant TLB entry is set to indicate that the page has been pinned. In a preferred embodiment, this information is then automatically reflected back in the page table entry (PTE) in the main memory. It is understood that in a virtual memory system a complete page table is maintained in the main memory. The TLB is merely a subset of the complete page table, and changes to entries in the TLB must be reflected back in the page table in main memory. Setting of bits in the main page table to reflect the status of the TLB may be done through hardware or software. In a preferred embodiment, microprocessor hardware automatically reflects any changes in the TLB back to the page table in the main memory. Method for microprocessor automatically reflecting updates to TLB back to the PTE is known in the art and has been used in such prior microprocessors as the PowerPC 604.

In an SMP system where there are multiple microprocessors each with its own TLB, update to one TLB is also reflected to other TLB's preferably by using a bus snooping technique. In a preferred embodiment, TLB updates are broadcasted onto the system bus in the form of a TLB update bus transaction. Each processor watches for TLB updates, and when one is seen, it checks if its own TLB contains a copy of the entry concerned, and if so, the processor will update the relevant entry in its own TLB accordingly, using the information provided in the TLB update bus transaction. In a preferred embodiment, this technique is used whenever TLB is modified to ensure that all TLB's are kept updated.

In order to ensure that a user-level job does not pin down too much of a system's memory, a preferred embodiment of the present invention maintains a count of pages pinned down by each user-level job individually, as well as an overall system level count of the total number of pages pinned down. The number of pages which may be pinned down by any single user-level job or process, as well as the total number of pages which may be pinned down, is preferably capped at operator programmable levels. In a preferred embodiment of the present invention, an attempt to translate a virtual address to a to physical address and pin down the associated page in the memory will fail if either of these two counters is already at its maximum value. Accordingly, before any Trans_and_pin or Trans_and_pin_only transaction is complete, the counters are checked to see if they are at their maximum allowable value. If so, the physical addresses are not passed to the peripheral device or to the physical address register and the pages are not pinned down. Instead, the failure status of executing the trans-and-pin instruction is reflected in the <outcome> field of the instruction.

Figure 3:
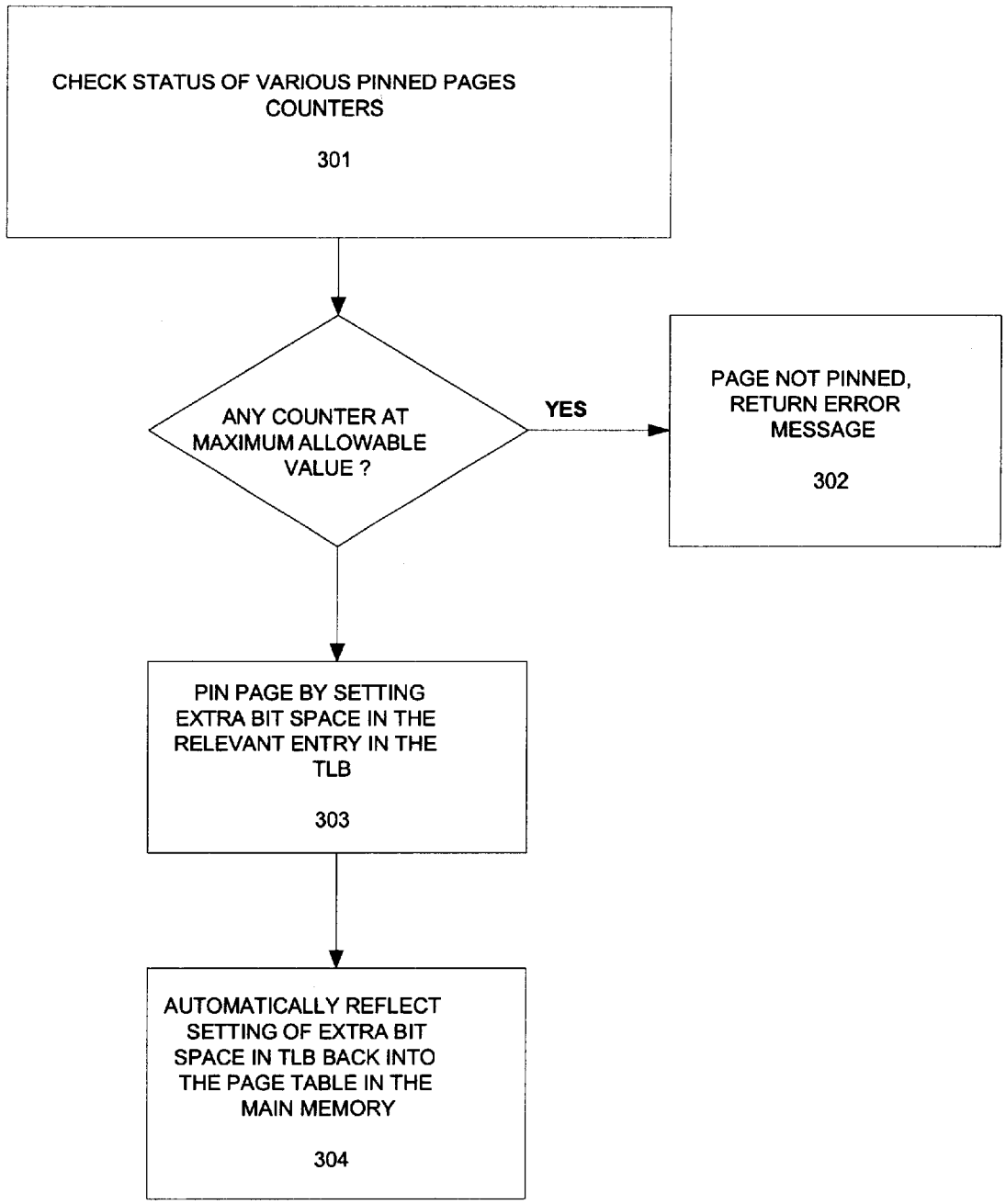
FIG. 3 is a flow chart that illustrates the process of "pinning down" pages in the memory in accordance with a preferred embodiment of the present invention.

FIG. 3 is a flowchart which illustrates the process of "pinning" down pages in accordance with a preferred embodiment of the present invention. It is assumed that user-level code has encountered a handling/processing request for a peripheral hardware device which requires the device to perform some memory operation. It is further assumed in the flowchart that the validity of the virtual address in the handling/processing has been checked. First, the status of the counters for tracking pages pinned down by the current user-level job and the total number of pages pinned in memory are both checked 301. If either counter is at its maximum allowable value, as predetermined and set at the operator programmable level, then the page is not pinned down and an error message is returned in the <outcome> field of the Trans_and_pin_only instruction 302. If neither counter is at its maximum allowable value, then the page can be pinned by setting the extra bit space in the relevant corresponding entry in the TLB 303. The setting of the extra bit space indicates that the page has been pinned, and this is automatically reflected back in the page table in the main memory 304. In a preferred embodiment, microprocessor hardware automatically reflects any changes to the TLB to be reflected back in the page table in the main memory. Accordingly, the relevant entry in the page table in the main memory is updated to indicate that the page has been pinned.

In a preferred embodiment of the present invention, pages may be pinned several times. This is particularly true in an SMP environment with a single multi-threaded user-level job running over several processors. Accordingly, in a preferred embodiment of the present invention, it is necessary to account for multiple pins of a single page in memory such that the page will not be unpinned and paged out until all uses of the memory page by peripherals, possibly initiated by different threads, have completed. In such a case, a per-page pin counter, the repeated-pin-count is set up to track the number of times the page has been pinned by the user-level job. This is stored with the TLB (and PTE) of that page. Accordingly, in a preferred embodiment of the present invention, when the microprocessor checks the relevant entry in the TLB, if the extra bit space in the relevant entry in the TLB has already been set (thereby indicating that the page has already been pinned out), then the page pin counter for that entry is incremented, thereby indicating that the page is pinned out twice to the user-level job. This process is repeated each time the page must be pinned. Since there is a maximum count that a repeated-pin-count counter can maintain, this also imposes a maximum that has to be checked. The per user-process and system-wide pinned page counts described earlier are only updated the first time a page is pinned, i.e. when the pinned bit of a page is set for the first time. Subsequent repeated pinnings do not increment these counters. This is so that these counters reflect a count of the unique pages pinned, where a page that has been pinned say ten times should only be counted once.

Unpinning Pages After Use

Additionally, the present invention further provides for a means for "unpinning" pages when the peripheral device has finished its operation and no longer needs to use the page. In a preferred embodiment of the present invention, the following user-level instruction allows user-level software to unpin a page without requiring a system call:

unpin <vaddr> where:

<vaddr> is a source operand identifying the virtual address of the page which is to be unpinned.

In a preferred embodiment, whenever this instruction is executed, the microprocessor will search the TLB for the virtual address <vaddr> and its corresponding physical address. The microprocessor will clear the extra bit spaces in the relevant entry in the TLB, thereby indicating that the page has been unpinned. Similar to the process of pinning, in a preferred embodiment of the present invention, the change in status of a page in the memory from "pinned" to "unpinned" is reflected back in the page table in the main memory. Once again, it is understood that in a virtual memory system, a complete page table is maintained in the main memory and the TLB is merely a subset of the complete page table. The relevant entry in the page table must also be updated to reflect that the page is "unpinned". This may be accomplished through hardware or software. In a preferred embodiment, microprocessor hardware automatically reflects any changes in the TLB to be written back to the page table in the main memory.

Figure 4:
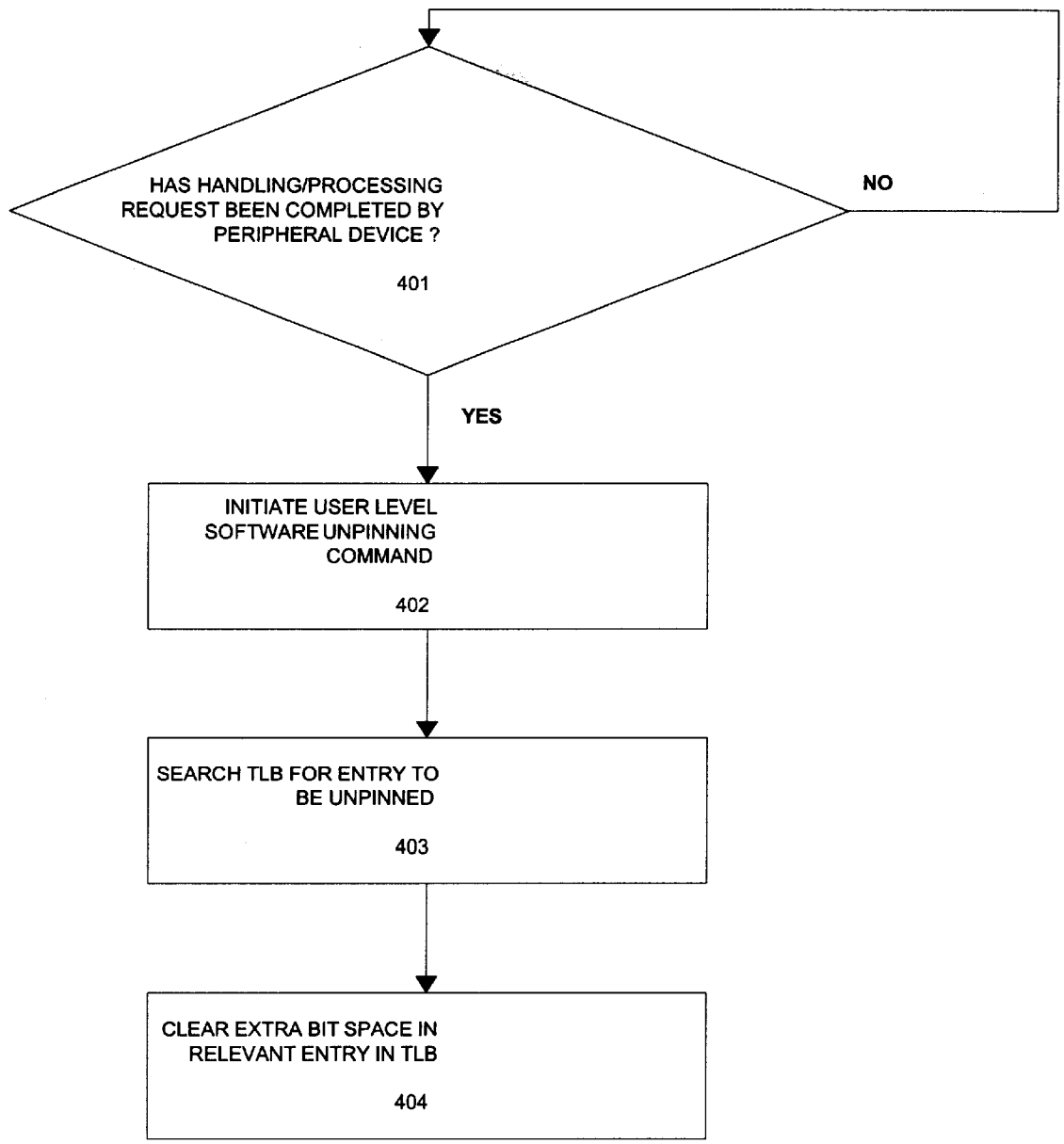
FIG. 4 is a flow chart that illustrates the process for "unpinning" pages in the memory, in accordance with a preferred embodiment of the present invention.

FIG. 4 is a flowchart which illustrates the process of "unpinning" pages used in a preferred embodiment of the present invention. It is assumed that a handling/processing request involving some memory operation has been sent to a peripheral hardware device, such as an Ethernet/network card. First, the microprocessor determines when the handling/processing request has been completed by the peripheral hardware device 401. This is accomplished through any one of several conventional mechanisms; including, periodic polling for completion status or signaling mechanisms from peripheral devices upon completion of a handling/processing request. Once the microprocessor determines that the handling/processing request has been completed, the microprocessor will initiate the user-level software unpinning command, as described earlier herein 402. The microprocessor will search the TLB for the virtual address of the pinned page in memory which is to be unpinned 403. The microprocessor will then check the extra pinned bit in the relevant entry in the TLB to make sure that it is set, and then clear this bit 404. (If this bit is not previously set, an exception is raised.) The clearing of the extra bit space and the unpinning of the page is automatically reflected back in the page table in the main memory by microprocessor hardware.

As described earlier, in a preferred embodiment of the present invention, a single page in the memory may be pinned several times by a user-level job; particularly in an SMP environment where the job is multi-threaded over several processors. In such a case, before the extra bit space in the relevant entry in the TLB is cleared (thereby completely unpinning the page), it is necessary to check the page pin count. Accordingly, in a preferred embodiment, the page pin counter is first checked to determine whether the page has been pinned multiple times by the user-level job. As explained earlier herein, the per-page repeated-pin-counter tracks the number of instances or times the page has been pinned by the user-level job. If this counter is not zero, then it is decremented by one and the extra bit space in the relevant entry in the TLB is not cleared. In such a case, it is not necessary to update the page table in the main memory although it is still necessary to broadcast this information with a bus transaction in an SMP environment so that other processor's TLB's can be updated. However, if the per-page repeated-pin counter is zero, then the extra bit space in the relevant entry in the TLB is cleared and this change in the TLB is automatically reflected back to the page table in the main memory.

Whenever the pinned-bit in a TLB entry is cleared, effectively unpinning a page and making it available for paging out, the per-process and system wide pin counters are decremented to reflect this change. System-wide unpinning of a page invalidates any physical address of that page stored in a physical address register. As such, in a preferred embodiment, the unpinning of a page has to be made known to all microprocessors in the system, because any physical address register containing the relevant physical address is made invalid. In the general case of an SMP system, this is achieved by the microprocessor broadcasting a bus operation which indicates that a page has been unpinned. All microprocessors in the SMP system watches for such a bus transaction using standard snoopy bus techniques. When such a bus transaction is observed, each microprocessor checks its physical address registers for matches. A page unpin bus transaction provides the physical address of the page that is being unpinned to make this matching process possible. Once a match is found, the corresponding valid bit of the physical address register is cleared to indicate an invalid entry. This ensures that the physical address stored in that register can no longer be used in a Send_physical instruction.

It is understood that in some cases, a page that has been pinned repeatedly needs to be unpinned without regard to how many times it has been pinned. One such instance may be when a user process is aborted and the operating system needs to unpin pages pinned by the user process. As such, in a preferred embodiment, two additional unpin type instructions are provided:

force_unpin <vaddr>
where:
<vaddr> is a source operand identifying the virtual address of the page which is to be unpinned;
and
weighted_unpin <vaddr>, <count>
where:
<vaddr> is a source operand identifying the virtual address of the page which is to be unpinned; and
<count> is a source operand specifying the number of times the per-page repeated-pin-count is to be decremented.

The instruction force_unpin is similar to the unpin instruction except that it disregards the repeated-pin-count of a page. Accordingly, the page pin counter is not checked. Instead, when this instruction is executed, the page is unpinned, regardless of the number of times it has been previously pinned and the page pin counter is reset to zero. Moreover, when this instruction is executed, the microprocessor clears the TLB's pinned bit for the relevant entry in the TLB. In one preferred embodiment, force_unpin will raise an exception if the TLB entry's pinned bit has not previously been set.

The instruction weighted_unpin is a variant of the unpin instruction. In contrast to a normal unpin instruction which decrements the repeated-pin-count of the relevant page by one before testing whether this is the last unpin that will effectively unpin a page, weighted_unpin decrements the repeated-pin-count by the number specified in <count> before testing whether this brings the count down to zero, thus effectively unpinning the page. Functionally, this instruction has the same effect as executing the unpin instruction repeatedly a number of times specified by its <count> input operand.

Many different embodiments of the present invention can be made without departing from the spirit and scope of the invention. Therefore, the invention is not intended in any way to be limited solely to the specific embodiments set forth and described herein; but, rather, is only limited by the scope of the claims and their equivalents.

What is claimed is:

1. A memory system for converting virtual addresses into physical addresses at the user code level and conveying the physical addresses to a peripheral device, the system comprising:

a virtual memory having memory pages, each memory page having a virtual memory address and a corresponding physical memory address in a main memory;

a microprocessor having a translation look-aside buffer which holds a subset of the virtual addresses for all the pages and their corresponding physical memory addresses in the main memory; and a set of user-code level software instructions stored in said main memory and executable by said microprocessor for converting a virtual memory address into the corresponding physical memory address, pinning the page, and conveying the physical memory address to the peripheral device at a user code level without requiring a system call and wherein the set of user level software instructions includes instructions for:

incrementing a per-process pin page counter each time a new page is first pinned by a same process; and incrementing a system wide pin page counter, each time a new page is first pinned by any process within the system.

2. The memory system of claim 1, wherein the set of user-code level software instructions directs the microprocessor to utilize the translation look-aside buffer (TLB) in order to convert the virtual memory address into its corresponding physical memory and pin the page.

3. The memory system of claim 1, wherein the set of user-level software instructions include instructions for unpinning the page, which corresponds with the physical memory address conveyed to the peripheral device, when the peripheral device has completed its operations.

4. The memory system of claim 1, further comprising a page pin counter, which is incremented each additional time a page is pinned down after a first time said page is pinned down.

5. The memory system of claim 1, wherein the set of user-level software instructions include instructions for unpinning the page in memory, by:

decrementing the page pin counter each time the page is to be unpinned; and unpinning the page which corresponds with the physical memory address conveyed to the peripheral drive, once the page pin counter has reached zero.

6. The memory system of claim 1 wherein the set of user level instructions include instructions for:

checking values in the per-process pin page counter and the system wide pin page counter each time a new page is to be pinned within the system; and not pinning the new page associated with the physical address if either of these counters contains a value which exceeds a maximum allowable value; otherwise, pinning the new page.

7. A set of user-code level software instructions executable by a microprocessor for converting a virtual address to a physical address, pinning an associated page, and conveying the physical address to a peripheral device without requiring a system call, the instructions comprising:

a Trans_and_pin instruction for converting the virtual address to a physical address, pinning the page associated with the physical address and conveying the physical address to the peripheral, the Trans_and_pin instruction including:

a <vaddr> source operand containing the virtual address to be converted; and a <target> source operand containing the address of the peripheral device to which the physical address is to be conveyed, and wherein said Trans_and_pin instruction:

increments a per-process pin page counter each time a new page is first pinned by a process; and increments a system wide pin page counter, each time a new page is first pinned within the system.

8. The set of user code level instructions of claim 7 wherein the Trans_and_pin instruction increments a page pinned counter each time the page associated with the physical address is pinned.

9. The set of user code level instructions of claim 7 wherein the Trans_and_pin instruction checks the per-process pin page counter and the system wide pin page counter, each time a new page is first pinned within the system, the Trans_and_Pin function not pinning the page associated with the physical address, if either of these counters contains a value which exceeds a maximum allowable value.

10. The set of user-code level instructions of claim 7 wherein the Trans_and_pin instruction further includes:

an <outcome> destination operand containing information which indicates whether the conversion of the virtualaddress has been executed successfully or the reasons for failure, if any.

11. The set of user-code level instructions of claim 7, further comprising:

a Trans_and_pin_only instruction for converting the virtual address to a physical address, pinning the page associated with the physical address and storing the physical address in a register location, the Trans_and_pin_only instruction including:

a <vaddr> source operand containing the virtual address to be converted; and a <phy_addr_reg> destination operand containing a register location where the physical address is to be stored.

12. The set of user-code level instructions of claim 11 wherein the register location specified in <phy_addr_reg> can only be written to in user-level code by using the Trans_and_pin_only instruction.

13. The set of user-code level instructions of claim 12 wherein the register location contains a valid bit which is set after the Trans_and_pin_only instruction stores the physical address in the register location.

14. The set of user code level instructions of claim 11 wherein the Trans_and_pin_only instruction increments a page pinned counter each time the page associated with the physical address is pinned.

15. The set of user-code level instructions of claim 11 wherein the Trans_and_pin_only instruction further includes:

an <outcome> destination operand containing information which indicates whether the conversion of the virtual address to the physical address has been executed successfully or the reasons for failure, if any.

16. The set of user-code level instructions of claim 11 or 13 further comprising:

a send_physical instruction for transferring the contents of the register location specified in the Trans_and_pin_only instruction to a peripheral device, the send_physical instruction including:

a <phys_addr_reg> source operand which specifies the register location; and a <target> source operand containing the address of the peripheral device.

17. The set of user code level instructions of claim 16 wherein the send_physical instruction checks the valid bit in the register location specified in <phys addr reg> to make sure it is set before transferring the contents of the register location to the peripheral device.

18. The set of user code level instructions of claim 7 or 11, further comprising:

an unpin instruction for unpinning the page previously pinned by the Trans_and_pin or Trans_and_pin_only instruction once the peripheral device is done using the page, the unpin instruction including:

a <vaddr> source operand containing the virtual address of the page to be unpinned.

19. The set of user code level instructions of claim 8 or 14 wherein the unpin instruction decrements the page pinned counter each time the page is to be unpinned and then actually unpins the page only when the contents of the page pin counter is zero.

* * * * *